United States Patent [19]

Holdren

[11] 4,332,125
[45] Jun. 1, 1982

[54] APPARATUS AND METHOD FOR PRODUCING HIGHLY NUTRITIVE STORAGE STABLE FORAGE PLANT MATERIAL

[76] Inventor: Richard D. Holdren, 5384 Co. Rd. 1, West Liberty, Ohio 43357

[21] Appl. No.: 179,465

[22] Filed: Aug. 19, 1980

[51] Int. Cl.³ .............................................. A01D 61/00
[52] U.S. Cl. .......................................... 56/1; 100/75; 100/118; 56/16.4
[58] Field of Search ...................... 56/1, 16.4; 100/73, 100/74, 75, 118, 153

[56] References Cited

U.S. PATENT DOCUMENTS

| | | | |
|---|---|---|---|
| 3,016,818 | 1/1962 | Barreto | 100/75 |
| 3,552,304 | 1/1971 | French et al. | 100/75 |
| 3,585,730 | 6/1971 | Morse | 56/1 |
| 3,796,317 | 3/1974 | Lippert et al. | 100/118 |
| 3,922,963 | 12/1975 | Sanderson | 100/118 |
| 4,109,448 | 8/1978 | Kline | 56/1 |

FOREIGN PATENT DOCUMENTS 2019731 11/1979 United Kingdom ................. 100/75

*Primary Examiner*—Robert A. Hafer
*Attorney, Agent, or Firm*—Murray and Whisenhunt

[57] ABSTRACT

A highly nutritive, storage-stable forage plant material in mat configuration having a moisture content of 20% by weight. The mat includes forage plant material in a cut and fiberized form in which substantially all plant cells of the plant material have been ruptured and the natural juices expressed therefrom reintroduced onto the mat prior to drying on the stubble to replace nutrients contained in the natural juices. The fiberized plant material includes fibers which have been exposed and at least partially separated so that they mechanically interlock and intertwine to produce a mat which is cohesive and shape-sustaining so as to be collectable from a field and stored without substantial tearing or breaking.

14 Claims, 11 Drawing Figures

APPARATUS AND METHOD FOR PRODUCING HIGHLY NUTRITIVE STORAGE STABLE FORAGE PLANT MATERIAL

The present invention relates generally to the harvesting and drying of forage crops, such as alfalfa. More particularly, this invention relates to a method of fiberizing and forming forage into cohesive mats which undergo rapid field drying when laid on the forage stubble, which are readily collected after drying, and which maintain a palatability, digestibility and nutrient level necessary for ruminants.

BACKGROUND OF THE INVENTION AND DESCRIPTION OF THE PRIOR ART

It is well known that forage crops such as alfalfa, clover, bermuda grass, timothy grass, sudan grass and the like are of great nutritional value to farm animals, for example cattle and horses. In particular, these crops contain such nutritional constituents as digestible protein and sugar which provide energy. Consequently, such crops are harvested with a view to storing the harvested crop for later use as foodstuff during the nongrowing or winter months. It is most important therefore that after cutting the forage material and during storage, degradation is reduced to a minimum so as to preserve the high nutritive value of the freshly cut forage material.

In the past, several techniques have been employed in the cutting and drying of forage crops. A widely practiced technique is that of cutting and conditioning the crop and leaving it to dry on the field. The drying period is usually from 2 to 3 days but can be longer, for example from 5 to 6 days, depending on the prevailing temperature, wind and cloud conditions. During the drying period, the cut crop may be raked and left in windrows to dry further. When the water content of the crop has reached an acceptably low level, usually in the range 10 to 20% by wet weight or less, the dried crop, now referred to as "hay", is baled and stored, usually in a barn. If the water content of the crop is not reduced to a satisfactory low level, usually 10 to 20% by weight or less, bacterial and fungicidal growth will take place. This will not only cause spoilage and decreased nutritive value of the hay, but also may generate sufficient heat to cause autocombustion, thereby giving rise to a serious fire hazard.

A principle disadvantage of the harvesting technique described above is the problem of rainfall which may extend the drying period, which as indicated above may be as long as 6 days depending on the prevailing weather conditions. In this event, the cut crop remains damp for longer periods of time which, in turn, increases the chances of spoilage before the crop has dried. Prolonged exposure and additional raking or turning of rained-on-hay also substantially reduces the harvested yield of hay. Once the cut crop begins to spoil, the value of the crop as a foodstuff form farm animals is substantially reduced, and eventually the crop becomes completely unacceptable for that purpose.

The early U.S. Pat. No. 1,816,998 to Cushman discloses a method for accelerating the drying of freshly cut alfalfa and similar vegetable material in which the alfalfa is crushed immediately after cutting while still fresh and green to force the natural juices from the cells of the plant to the outside where they can evaporate more rapidly. The crushed leaves and stems are loosely distributed on the field and drying to an acceptable moisture content is generally completed within 12 to 18 hours. While this accelerated drying time is important, the major problem with this technique is the difficulty of raking and collecting the crushed material when dry. Generally, rakes are not designed to collect such finely crushed material and, thus, it is almost impossible to economically collect the crushed forage off the stubble.

U.S. Pat. No. 2,607,688 to Peebles et al discloses a process for reducing the extent of degradation of nutritive value of alfalfa and like materials which occurs during drying. In the process the freshly cut alfalfa is chopped and subjected to an acid and heat treatment which causes coagulation of the protein in the chopped alfalfa. The material is then subjected to mechanical pressure in an expeller which expresses the natural juices but causes the carotene to remain in the material.

U.S. Pat. No. 2,942,976 to Kosch describes a method of pelleting roughage crops such as alfalfa and similar crops, in which the severed forage is shredded in a chopper or hammermill, dehydrated and then formed into pellets. The shredding step reduces the forage to a form in which most of the stems and leaves are intact but have been reduced to short lengths.

Published British Pat. No. 2,019,731 to Krutz describes an apparatus for macerating forage products to enhance drying in a reduced period of time. The freshly cut forage is macerated by being passed between two rotating serrated rollers operated at different rotational speeds with respect to each other. The resulting macerated product is formed into a mat by pressure between a roller and a conveyor belt, and the mat is then deposited on the field for drying. The maceration is said to shear and shred the stems and leaves so as to expose more surface area for faster drying and to promote interweaving of the fibrous material to form a mat. During the mat formation, juices are expressed from the material by pressure between the roller and the conveyor belt, and these juices are collected by passage through perforations in the conveyor system but are not subsequently used.

The Krutz approach has two serious disadvantages. First, if a large proportion of the juices are expressed during mat formation, the nutritive value of the forage is seriously reduced. On the other hand, if large proportions of the juices are not expressed during mat formation, a wet (heavy) and non-cohesive mat results and the mat will not be in a mat-sustaining form. Furthermore, a wet mat will significantly disrupt the interweaving of the macerated material into a shape-sustaining mat. The wet mat is thus poorly formed and has a tendency to distort and fall apart during the drying stage, which increases the drying time. In addition, a poorly formed mat is difficult to collect after drying.

OBJECTS OF THE INVENTION

It is therefore an object of the present invention to provide an improved method for drying and collecting forage crops such as alfalfa and like materials.

It is another object to provide a method of drying and collecting forage crops in which the cutting, drying, and collecting of the dried crop can be completed within a day or less and in which the nutritive value of the crops is substantially preserved.

It is a further object to provide an improved apparatus for carrying out the method of the invention.

It is yet a further object to provide a highly nutritive storage stable hay-type animal feed.

DESCRIPTION OF THE INVENTION

According to the present invention, there is provided a method of producing a highly nutritive, storage-stable material in mat configuration having a moisture content of about 20% by weight or less. The method comprises the steps of cutting standing forage crops at a point near the ground so as to provide freshly cut forage and to leave a stubble of cut stems on the field. The freshly cut forage is then fiberized to produce fiberized forage in which fibers of the forage are exposed and at least partially separated, and substantially all of the cells of the forage are ruptured to release and express natural juices from within the cells. The fiberized forage is then subjected to pressure to further express natural juices, and to compress and compact the fiberized forage to cause the fibers to interlock and intertwine with each other to form a cohesive and shape-sustaining mat which will not sink, bend or otherwise deflect sufficiently to contact the ground and which will indeed remain in a substantially planar configuration. The mat has a moisture content of no greater than about 75% by weight. The natural juices expressed from the freshly cut forage during the fiberizing and compressing steps are collected to provide a reservoir of collected natural juices, at least a portion of which is used later in the method as described below. The mat is then separated into mat sections and these are laid sequentially onto the stubble so that they are supported off the ground by the stubble. Substantially all of the collected natural juices are then applied to the upper surface of each of the mat sections, while disposed on the stubble, to produce a treated mat section having a nutritive value substantially equivalent to that of the freshly cut forage prior to expressing the natural juices. By applying the natural juices to the upper surface of the mat section, ready moisture evaporation from the mats is facilitated resulting in rapid drying of the treated mat sections while on the stubble. The treated mat sections are then exposed to natural solar radiation and to the passage of air over both the upper and under sides of the treated mat sections so that they are dried rapidly to a moisture content of 20% by weight or less. The resulting dried mat sections are cohesive and self-supporting, and capable of being easily collected from the stubble and further handled without substantial tearing or breaking.

According to the present invention, there is also provided a storage-stable forage plant material in mat configuration having a moisture content of about 20% by weight or less and having a high nutritive value. The mat comprises the forage plant material in a cut and fiberized form, in which substantially all plant cells of the plant material have been ruptured and natural juices expressed therefrom, with the natural juices having been introduced onto the mat prior to drying to replace nutrients contained in the natural juices. Fiberization of the plant material results in the fibers being exposed and at least partially separated from the plant material, and the exposed and at least partially separated fibers are mechanically interlocked and intertwined so that the mat is sufficiently cohesive and shape-sustaining to be collectable from a field and stored without substantial tearing or breaking.

The present invention further provides an apparatus for producing a highly nutritive storage-stable forage plant material in mat configuration having a moisture content of about 20% by weight or less and being readily recoverable from the field without substantial tearing or breaking. The apparatus comprising a cutting means for cutting the forage at a point near the ground so as to provide freshly cut forage and leave a stubble of cut stems on the field. A fiberizing means is operatively connected to the cutting means for receiving and fiberizing the freshly cut forage to produce fiberized forage in which fibers of the forage are exposed and at least partially separated and substantially all cells of the forage are ruptured to release and express natural juices from within the cells. Compressing means are operatively connected to the fiberizing means for compressing the forage and further expressing natural juices therefrom to produce compressed fiberized forage. Juice collecting means is operatively connected to at least one of the fiberizing means and the compressing means for collecting the natural juices expressed by the fiberizing means and compressing means to provide a reservoir of collected natural juices. A mat forming means is operatively connected to the compressing means for mechanically interlocking and intertwining the compressed fiberized forage into a cohesive and shape-sustaining mat having a moisture content of no greater than 75% by weight. A mat depositing means is connected to the mat forming means for separating the mat into mat sections and laying the mat sections sequentially onto the stubble. A juice application means is provided for applying the collected natural juices onto an upper surface of each of the mat sections just after being deposited on the stubble to dry to thereby produce a mat section having a nutritive value substantially equivalent to that of the freshly cut forage prior to expressing the natural juices.

In the first step of the method of the invention, the standing crop is cut at a point near the ground to leave a stubble of cut stems on the field. Generally, the length of the stubble varies from about 1 inch to 12 inches, usually 2 inches to 8 inches, more usually 3 inches to 5 inches. The length of the stubble should be such that the mat of fibrous material is satisfactorily supported off the ground to allow the free flow of the air to the under side as well as the upper side to aid the drying process.

After the forage material has been cut, it is transferred to a fiberizing device which fiberizes the forage. The expression "fiberizing" as used in this specification and claims means that the fibers of the freshly cut forage are exposed and at least partially separated, and substantially all of the cells are ruptured to release and express natural juices from the cells. During the fiberizing, the leaves and stems of the freshly cut forage material are ripped and subdivided, but one characteristic of the fiberizing is that much of the original length of the fibers is maintained to avoid problems of feeding finely ground forage material to ruminants. However, fiberization does produce fibers which are sufficiently exposed and separated to allow mechanical interlocking and intertwining of the fibers to form a cohesive and self-supporting mat which does not bend or otherwise deflect sufficiently to touch the ground when laid on the stubble to dry, and which does not substantially tear, split or break apart during handling or collecting of the mats. In the fiberizing step, the freshly cut forage is ripped and subdivided so that a substantial proportion of the material, i.e., at least 75%, usually 85 to 95%, is severed, ripped, or torn to produce exposed and separated fibers having a length of about 0.1 inch to 5 inches, usually to about 0.25 inch to 3 inches, e.g., averaging about 1 inch. The thickness of the fibers ranges from about 0.001 to 0.15 inch. A futher characteristic of fiberization is that a substantial proportion of the plant cells in the freshly cut forage are ruptured to release the natural plant juices so as to facilitate rapid drying when the material is formed into a mat and laid on the stubble to dry. Under optimum conditions, freshly cut forage is considered to be adequately fiberized when it can be formed into mats which are sufficiently cohesive and shape-sustaining to rest substantially on top of the stubble after being soaked by expressed natural juices, followed by drying in the field in less than about ⅓ of the time, more usually in less than ¼ of the time, required to dry the same forage in a cut unfiberized state when the mats cover substantially the same area of stubble which results from cutting the forage contained in the mats.

Following fiberization, the fiberized forage is moved to a mat forming apparatus which compresses and compacts the fiberized forage into a self-supporting and cohesive mat. Individual dispersed pieces of moist fiberized forage are generally forceably thrown from the fiberizer, for example, at a rate of about 200 to 2000 pounds per minute, more usually 50 to 1000 pounds per minute, and this causes some interlocking and intertwining of the fiberized forage to occur in view of the random and disarrayed movement of the material. Thus, the fiberized material is already in a loosely cohesive form when it reaches the mat forming apparatus, and the action of compressing and compacting to form the mat adds further cohesiveness to the mat structure. During compression of the forage material to form the mat, natural juices are further expressed from the material and these are collected for later use, typically for spraying onto the mat when it has been laid on the stubble to dry. The collection of the juices is most conveniently achieved by compressing the forage material on a perforated conveyor belt so that the expressed natural juices pass through the perforations in the belt and are collected in a trough or other means located underneath. The juices may then be transferred to a reservoir or accumulator ready for spraying or disposal or other utilization, as may be desired.

After the mat has been formed, it is laid on the forage stubble to dry. Generally, the mat simply breaks and falls from the belt onto the stubble under the influence of gravity, but in some instances the mat may stick slightly to the belt and it is necessary to force the mat off the belt. This may be achieved, for example, by directing a blast of air through the perforations of the belt to dislodge the mat. At the point where the mat falls from the belt, the mat is usually no more than about 6 to 18 inches above the stem stubble. The mat at this stage generally has a moisture content of about 45 to 75% by weight, more commonly about 60 to 70% by weight, and is fairly pliable. When the mat falls onto the stubble, some penetration of the fibrous web usually occurs, but this is generally not sufficient to cause splitting of the mat substantially to break it apart. The mat is sufficiently cohesive and shape-sustaining to maintain its structural integrity while on the stubble. The mat generally retains a substantially planar configuration while supported on the stubble, and this allows air to freely flow over both the upper and lower surfaces of mat to aid in the drying process.

After the mat has been laid on the stubble, the collected natural juices expressed from the freshly cut forage during the fiberizing and mat forming steps are applied, usually by spraying, onto an upper surface of the mat. The natural juices of the forage contain important nutritional constituents, in particular protein and sugars, and by applying this juice onto the mats, it is possible to produce a highly nutritive mat having a nutritive value substantially equivalent to that of the freshly cut forage prior to expressing the natural juices, without significantly increasing the drying time of the mats. The reason for this is that once the natural juices have been expelled from the cells of the forage material, the water can more readily evaporate leaving the nutritive constituents on the surface of the mat. Plant fluids which are not expressed from the cellular structure of the plant material take longer to evaporate, so that crops which are simply cut and left on the field have a much longer drying time than the mats of the present invention.

Among the many advantages of present invention is the easy of recoverability of the mats from the field after drying. As the drying proceeds and the moisture content is reduced to the desired level, generally about 20% by weight or less, usually 5 to 15% by weight, more usually 8 to 10% by weight or less, e.g., about 10% by weight, the mats become somewhat more rigid, which together with increased cohesiveness, allows for the mats to increase their mechanical strength and permits very easy and quick collection using conventional harvesting equipment. A further advantage is that the mats can be very compactly stored in layers or piles in a storage area.

The desired moisture content of the mats is generally reached under favorable drying conditions, such as a sunny, breezy day, with a humidity of about 40 to 60%, within two to six hours, more usually three to four hours. However, this period may be longer if there is sufficient cloud cover, but is usually less than ten hours, for example seven to nine hours or less when shadows are just discernible.

The mats produced according to the present invention are storage-stable and have a high nutritive value. The expression "storage-stable" as used in the present specification and claims means that the mats can be stored under cover over a significant length of time without the onset of appreciable degradation. In particular, the mats can be stored over the non-growing season, and can be feed to farm animals as desired during the season without fear that nutritive degradation has occurred due to spoilage. The expression "highly nutritive" as used in this specification and claims means that the mats have a nutritional value or content substantially equivalent to that of cut forage crops which have been dried in the fields according to conventional farming procedures and then stored under cover in a barn or the like.

DETAILED DESCRIPTION OF THE DRAWINGS

Figure 1:
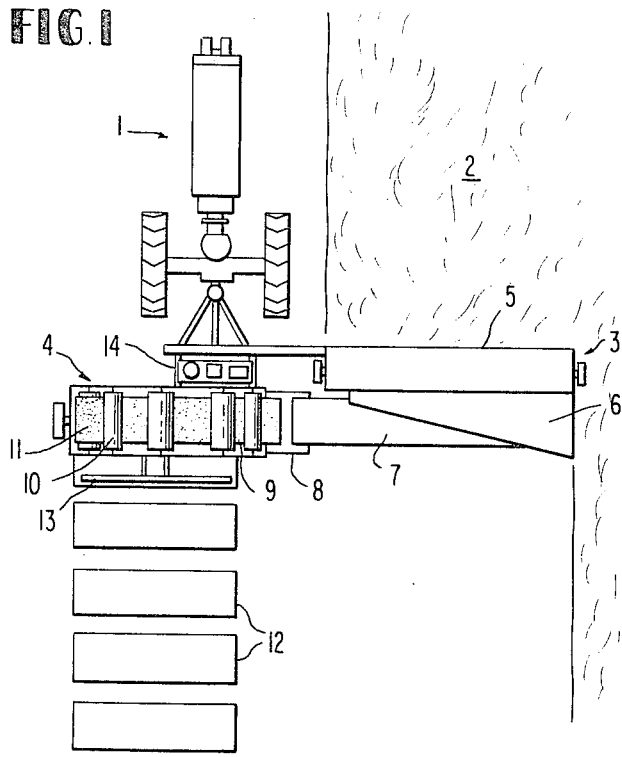
FIG. 1 illustrates a general configuration of a tractor-mover-conveyor and apparatus for carrying out the method of the present invention.

With reference to the drawings, FIG. 1 shows a suitable configuration for carrying out the method of the present invention. The configuration consists of a conventional tractor 1 which pulls a conventional cutter 3, both of which are operated in a field 2 of standing forage crops. Mat or web forming apparatus 4 deposits mats on the field after the vegetable matter has passed through the configuration of FIG. 1. The tractor 1 may be of any conventional design and merely provides the necessary motive power for the cutter and mat-forming apparatus. The cutter 3 can be of any conventional design but it is preferred that it is of the flail-type for cutting the growing crop from the field. In operation of this type of cutter, rotatory flail knives 5 cut and throw the forage up chute 6 which drops the forage on a continuous conveyor belt 7 to form a relatively uniform deposit thereon. The conveyor belt in turn deposits the cut forage into fiberizer 8 which is shown in diagramatic form in FIG. 2.

In the fiberizer 8, the forage is fiberized by an abrasive action, which is described in more detail below, to rip and subdivide the forage to the extent described above and, preferably, leave substantially no stems and leaves intact. The fiberized forage is then deposited onto the leading edge of a press and mat or web former 9, and by coaction of a series of rolls 10 and an endless perforated belt 11, a mat of fiberized forage is produced. The mat travels to the underside of the mat former 9 and may be blown from the mat former by a blast of air, optionally by way of a cutting and/or brushing action and deposited onto the stubble of the cut forage as a series of mats 12. As the apparatus passes over the last laid mat, the natural juices collected during the fiberizing and mat-forming steps may be sprayed onto the last laid mat by means of a spray boom 13. The fiberizing and mat-forming apparatus carries as an integral unit associated equipment, such as power sources, air compressors, pumps, accumulators and the like, on a utility platform 14. This associated equipment is conventional and may be as desired.

Figure 2:
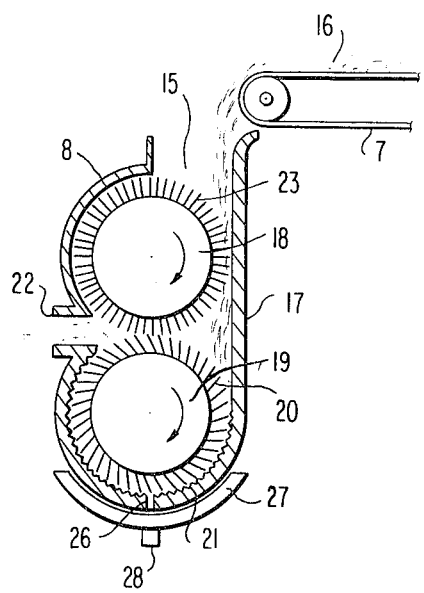
FIG. 2 is a diagramatic illustration of a suitable mechanical means for fiberizing the cut forage.

Considering in detail the fiberizer of the invention, one suitable embodiment is depicted in FIG. 2 where the fiberizer, generally referred to as 8, is disposed below conveyor 7 and has a throat 15 for receiving forage 16 which has been cut by the cutter 5 and deposited on the conveyor 7 by way of a guide chute 6. The fiberizer suitably has a housing member 17 which encloses a brush roll 18 and a fiberizing roll 19. Both the fiberizing roll and the brush roll are driven in a clockwise direction as seen in FIG. 2. The fiberizing roll 19 carries on its periphery, abrasion devices 20 which coact with irregular surface 21 to fiberize the forage as it passes between the fiberizing roll 19 and the irregular surface 21. Since the fiberizing roll is rotated in a clockwise direction, the fiberized forage is thrown toward exit throat 22 and exits as a moist dispersed array of fibers.

The brush roll 18 performs essentially two functions. As seen in FIG. 2, the brush roll is provided with brush protuberances 23 which are relatively soft and yieldable in nature. As the roll is driven in a clockwise direction, the incoming forage 16 is urged along the housing 17 and into the nip formed between the fiberizing roll 19 and the irregular surface 21. As the fiberized forage approaches the exit throat 22, portions of the fiberized forage, in view of its moist nature, may adhere to the abrasion devices 20, and the relatively soft and yieldable brush protuberances 23 which are moving in a direction toward the exit throat 22 and in a direction opposite to the abrasion devices 20, forcibly brush the adhered fiberized forage from the abrasion devices 20 and eject it through exit throat 22. One advantageous feature of this particular design of fiberizer is that the combination of the high centrifugal force experienced by the fiberized forage together with the brushing action of the brush protuberances results in very little tendency for the fiberizer to become jammed with fiberized material. The combined action of the two rolls tends to self-clear any build-up of forage material.

In view of the fact that some forages may be sufficiently succulent to contain such high amounts of juices that the fiberizing step can express juices therefrom, it has been found advantageous when harvesting such forage to provide one or more liquid exit holes 26 in housing 17 to drain the juices from the housing into a juice collector 27 which is provided with an exit pipe 28 for movement of the juice out of the collector.

Figure 3:
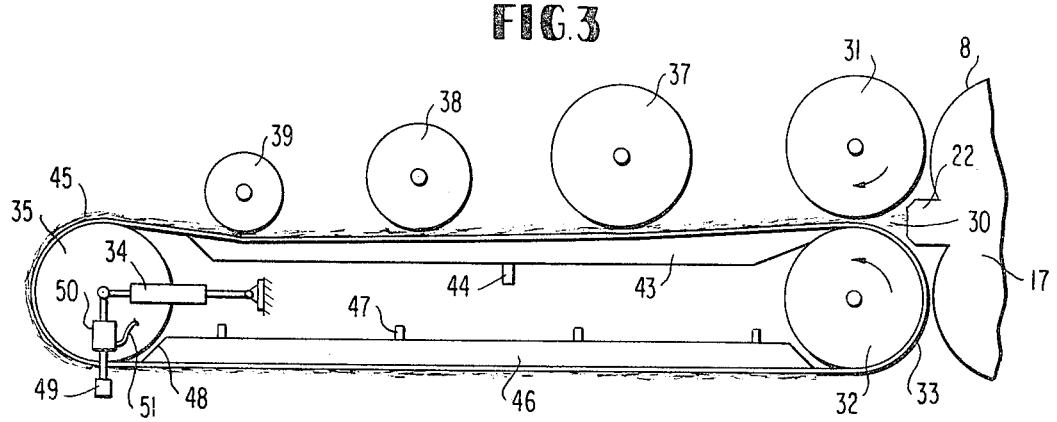
FIG. 3 is a diagramatic illustration of one embodiment of mechanical means for compressing and forming a mat from the fiberized forage.

After the fiberized forage exits the exit throat 22, it is formed into a cohesive self-supporting mat by subjecting the fiberized material to pressure on a moving belt. A suitable embodiment of apparatus for performing this function is shown in FIG. 3. In FIG. 3, fiberized forage 30 is thrown through exit throat 22 in the housing 17 of fiberizer 8 as more or less individual fibers and pieces of forage in such a disarray and random manner that the small fibers of the forage interloop, interlock and interlace into a loosely adhered mat at the nip formed between press rolls 31 and 32. A porous belt 33, suitably of perforated stainless steel or other relatively noncorrosive material, travels through the nip of rolls 31 and 32, and round roll 35. The belt 33 is maintained under tension by means of a tension device 34 which acts on roll 35 to move that roll and tension belt 33. As the fiberized forage passes between rolls 31 and 32 on the perforated belt it is compressed and formed into a loosely cohesive mat or web. Although it is possible to form the mat simply by coaction of two rolls, such as rolls 31 and 32 as shown in FIG. 3, or by a roll and a belt, it is preferred to form the mat by subjecting it to serial successive increasing pressures as may be accomplished by the pressures exerted in the nip formed between belt 33 and cooperating rolls 37, 38 and 39. Each of the rolls 37 to 39 may be pressed upon belt 33 with the same force but by decreasing the diameter of these rolls, the pounds per square inch pressure on the fiberized forage increases. In this way, as the belt 33 passes beneath the rolls 31 and 37 to 39, the fibrous material carried on the belt is subjected to a gradually increasing pressure which increases the degree of compaction of the fiberized material and produces a cohesive fibrous mat. If the rolls 31 and 37 to 39 are made of steel or other suitable metal, the mat may occasionally stick to the surface when it comes into contact therewith. To avoid this problem, a series of scraper blades (not shown) may be provided adjacent to the surfaces of the rolls 31 and 37 to 39 in order to remove any fibrous material adhering thereto. It has been found, however, that if the surfaces of the rolls 31 and 37 to 39 which come into contact with the fibrous material are provided with a plastics or rubber coating, the fibrous material shows very little tendency to stick thereto and it is accordingly unnecessary to provide scraper blades.

As the fibrous material passes through the nips formed between the rolls 31 and 37 to 39 and the perforated belt 33, juices are expelled and passed through the perforations of the belt into the juice collector 43 for subsequent passage through pipe 44 to a reservoir or accumulator (not shown) from which the juices can be reapplied to the mat after it has been laid on the forage stubble. The formed mat 45 is relatively wet and pliable, but nevertheless is cohesive and self-sustaining and has physical properties and an appearance very similar to those of a damp Kraft paper mat. The pliable mat 45 may remain adhered to the belt 33 as it passes around roll 35 and thus may come into register with the plenum 46 which is provided with a plurality of air inlet pipes 47. When the pliable mat 45 is in register with the plenum 46, air under high pressure is supplied through the perforations of the belt 33 to blow the mat 45 from the belt onto the stubble. For most plant materials, the mat 45 will simply break away from the belt at edge 48 of the plenum, but for material which has a higher strength, an outwardly acting pneumatic knife 49 actuated by an air piston 50 supplied with high pressure air through hose 51 may be employed to cut the mat at that point.

When the mat 45 is blown from the belt onto the forage stubble, it is supported off the ground thereby. In this condition, the mat is cohesive and shape-sustaining and will not sink, bend or otherwise deflect sufficiently to contact the ground. It is possible that some of the stubble will pierce portions of the mat, but this will not adversely affect the strength and cohesion of the mat. Indeed, the mat remains in a substantially planar configuration.

The natural juices collected during the fiberizing and mat-forming steps, as described above, may be collected in collectors 27 and 43 and transferred to a reservoir or accumulator (not shown) to supply spray boom 13 shown in FIG. 1 by way of a pressure pump. The boom 13 is mounted on the mat-forming apparatus such that is passes over the mat after the mat has been blown from the belt and is lying on the stubble. The juices can then be sprayed onto the mat in a quantity such that the total volume of juices contained in the accumulator neither increases nor decreases substantially.

Figure 4:
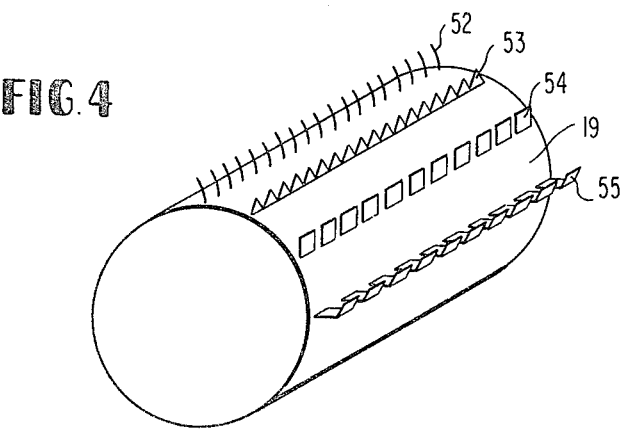
FIG. 4 illustrates embodiments of suitable abrasion devices for the fiberizing means of FIG. 2.
Figure 5:
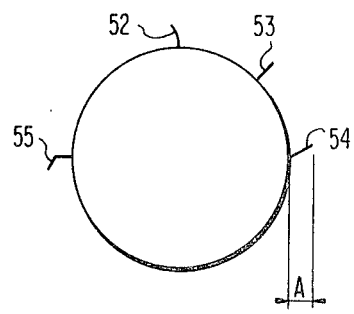
FIG. 5 is a side elevation view of FIG. 4.

As is clear from the description above, in order to produce the mat, it is necessary to fiberize the cut forage material in a fiberizer. While FIG. 2 shows an embodiment of a suitable fiberizer, it will be apparent that other similar devices may be used. The fiberizer shown in FIG. 2 consists of a stationary irregular surface 21 which coacts with the abrasion devices 20. Some examples of suitable abrasion devices for use with the fiberizing roll 19 are shown in FIGS. 4 and 5. For example, the abrasion devices may consist of curved pin-like members 52, rigid saw teeth 53 having a distance between points of about 1 inch and about ½ inch deep, inclined plate-like members 54, or angled plate members 55. Members 52 through 55 may also be arranged in staggered rows. While the distance that the abrasion devices extend from the surface of the fiberizing roll 19 is not critical, this distance should be sufficient to allow reasonable volumes of forage to be moved with sufficient pressure through the nip of the fiberizing roll 19 and surface 21. Accordingly, the distance A (as shown in FIG. 5) may be from ⅛ inch to 3 inches, preferably from at least ¼ inch and ½ inch and more preferably between ½ inch and 1 inch. The shape of the irregular surface 21 is not critical provided the surface performs the function of fiberizing the forage as it passes between the surface 21 and the fiberizing roll 19.

Figure 6:
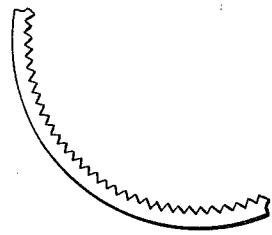
FIGS. 6 to 9 illustrate suitable irregular surfaces with which the abrasion devices of FIGS. 2, 4 and 5 coact for fiberizing the forage.
Figure 7:
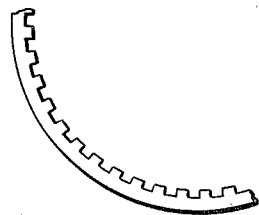
Figure 8:
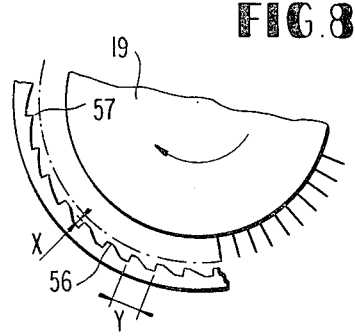
Figure 9:
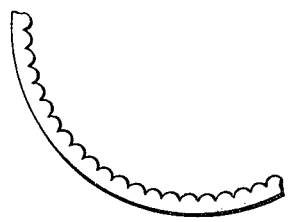

Examples of suitable irregular surfaces 21 are shown in FIGS. 6 to 9. Thus, the irregular surface 21 may be simply serrated as shown in FIG. 6, in the form of grooves as shown in FIG. 7, saw toothed as shown in FIG. 8, or curved as shown in FIG. 9. The preferred configuration for the irregular surface 21 is the saw toothed configuration of FIG. 8. The configuration may be flat toothed 56 or sharp toothed 57, or combinations of both. The distance Y between the teeth may vary from as little as ⅛ to four inches but usually from ¼ to 3 inches, more usually from ¼ to 1½ inch. A distance of ¼ inch is preferred. The tooth depth X may be from as little as 1/32 inch to as much as 1 inch but depths of from ⅛ to ½ inch, e.g., from ¼ to ⅜ inch are preferred. A depth of about 0.2 inch is particularly preferred.

In order to assist the flow of the forage between the fiberizing roll 19 and the irregular surface 21, either the surfaces 52, 53, 54 or 55 or surface 21, or both, should be resiliently mounted to allow for the increase in density of the forage as it passes through the fiberizer. If one or both of the fiberizing surfaces are not resiliently mounted there is a tendency for blocking to occur which reduces the efficiency of the fiberizer to produce the desired degree of fiberization.

It is preferred to provide adjustment means for adjusting the degree of fiberization produced by the fiberizer. This may be achieved by adjusting the brush roll speed and/or the fiberizing roll speed, or by adjusting the clearance between the abrasion devices 20 and the stationary irregular surface 21.

Figure 10:
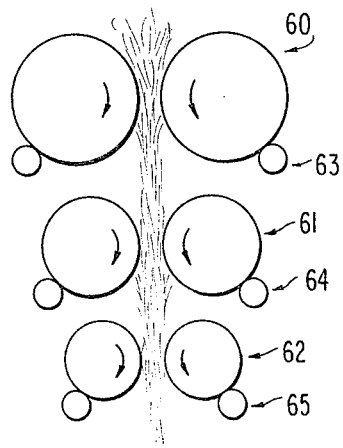
FIG. 10 is a diagramatic illustration of a further embodiment of mechanical means for fiberizing the forage.

Turning now to FIG. 10, this shows an alternative embodiment for a suitable mechanical means for fiberizing the cut forage. This device consists of a series of pairs of counter-rotating rolls generally referenced 60 to 62. Although 3 pairs of rolls are shown in FIG. 10, it is possible to use more or fewer pairs, although it has been found that incomplete fiberization is obtained when only one set of rolls is employed. In FIG. 10, the rolls on the left are mounted stationary, i.e., they cannot move laterally, and are driven faster than the rolls on the right which are resiliently mounted close to but not touching the rolls on the left to permit some lateral movement as varying amounts of forage material pass therebetween. The rolls 60 to 62 may be provided with surfaces similar to those shown in FIGS. 6 to 9, with that shown in FIG. 8 being preferred. By driving the rolls on the left at a faster rate than those on the right, an abrading action at the respective nips results which fiberizes the forage as it passes through the nips. As can be seen from FIG. 10, the diameters of each pair of rolls decreases gradually so that as the forage passes through the nips formed by the rolls, it is subjected to a gradually increasing pressure to reach the desired degree of fiberization. To increase the efficiency of fiberization and to prevent undue jamming of the fiberizer, each set of rolls 60 to 62 is provided with brush rolls 63 to 65 respectively. Each brush roll is driven at a speed which is greater than that of the roll which it is clearing so that fiberized material stuck to the surface of the rolls 60 to 62 is thrown into the nip of the next set of rolls below. Juices expressed during the fiberization can be collected in a collector (not shown) as desired.

Figure 11:
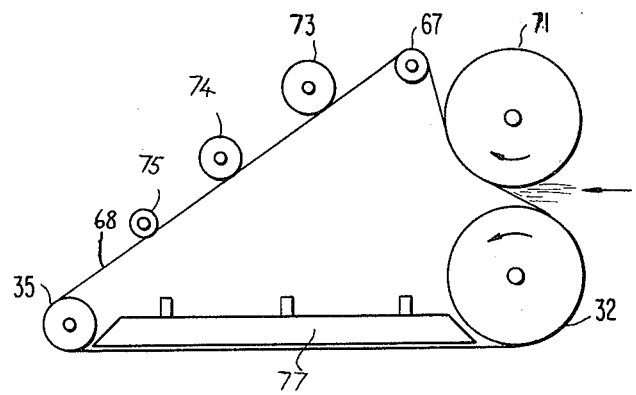
FIG. 11 illustrates a further embodiment of mechanical means for compressing and forming a mat from the fiberized forage.

FIG. 11 shows an alternative embodiment of a suitable mechanical means for compressing and forming a mat from the fiberized matter. In this embodiment, the fiberized forage is not compressed between two rolls as in the embodiment shown in FIG. 3, but rather the fiberized forage passes between the belt 68 and one roll 71 and is compressed in the nip between the belt and roll. The belt then carries the loosely compressed mat over an idler wheel 67, under rolls 73 to 75 which are of gradually decreasing diameter as rolls 37 through 39 in FIG. 3, and around roll 35 after which the web is blown off the belt via air plenum 77 in a manner similar to that described in connection with FIG. 3. Juices expressed during the compressing of the material to form the mat can be collected in a collector (not shown) and transferred to an accumulator or reservoir (not shown) for later use in spraying, as desired. It may also be desirable to have a roll coacting with roll 35 to achieve final, heavy squeezing of the mat. Furthermore, it may be desirable to include the possibility of (a) squeezing the mat between two porous belts, or (b) squeezing the mat between a porous and non-porous belt, or (c) forming the mat on a large porous roll and squeezing with rolls and/or a porous or non-porous belt.

What is claimed is:

1. A method of producing a highly nutritive, storage-stable forage plant material in mat configuration having a moisture content of 20% by weight or less and being readily recoverable from a field without substantial tearing or breaking, said method comprising the steps of:
   (a) cutting standing forage crops at a point near the ground so as to provide freshly cut forage and to leave a stubble of cut stems on the field;
   (b) fiberizing said freshly cut forage to produce fiberized forage in which fibers of the forage are exposed and at least partially separated, and substantially all of the cells of the forage are ruptured, to release and express natural juices from within the cells;
   (c) subjecting said fiberized forage to pressure to further express natural juices therefrom, and to compress and compact said fiberized forage to cause said fibers to interlock and intertwine with each other to form a cohesive and shape-sustaining mat having a moisture content no greater than 75% by weight;
   (d) collecting said natural juices expressed from said freshly cut forage to provide a reservoir of collected natural juices;
   (e) separating said mat into cohesive and shape-sustaining mat sections and laying said mat sections sequentially onto said stubble so that said mat sections are supported off the ground by said stubble;
   (f) applying at least a portion of said collected natural juices to an upper surface of each of said cohesive and shape-sustaining mat sections on the stubble to produce a treated mat section having a nutritive value substantially equivalent to that said freshly cut forage prior to expressing said natural juices, said applying of said natural juices to said upper surface of said cohesive and shape-sustaining mat sections facilitating ready moisture evaporation and rapid drying of said treated mat sections while on said stubble;
   (g) exposing said treated mat sections to natural solar radiation and to the passage of air over both the upper and under sides of said treated mat sections sufficiently to dry said treated mat sections to a moisture content of 20% by weight or less, to produce dried mat sections which are cohesive and shape-sustaining and capable of being collected without substantial tearing or breaking; and
   (h) collecting said dried mat sections from said stubble.

2. A method according to claim 1 wherein said collected natural juices are sprayed onto each of said cohesive and shape-sustaining mat sections substantially immediately after laying onto said stubble to dry.

3. A method according to claim 1 wherein said fibers of said fiberized forage have a length of about 0.1 inch to 5 inches.

4. A method according to claim 3 wherein said fibers of said fiberized forage have a length of about 0.25 inch to 3 inches.

5. A method according to claim 1 wherein said mat sections are dried to a moisture content of about 5% to 15% by weight or less.

6. A method according to claim 1 wherein said mat is mechanically severed into said cohesive and shape-sustaining mat sections.

7. An apparatus for producing a highly nutritive, storage-stable forage plant material in mat configuration having a moisture content of 20% by weight or less and being readily recoverable from a field without substantial tearing or breaking, said apparatus comprising:
   (1) cutting means for cutting said forage at a point near the ground so as to provide freshly cut forage and leave a stubble of cut stems on the field;
   (2) fiberizing means operatively connected to said cutting means for receiving said freshly cut forage from said cutting means and fiberizing said freshly cut forage to produce fiberized forage in which fibers of said forage are exposed and at least partially separated, and substantially all cells of the forage are ruptured to release and express natural juices from within the cells;
   (3) compressing means operatively connected to said fiberizing means for compressing said fiberized forage and further expressing natural juices therefrom to produce compressed fiberized forage;
   (4) juice collecting means operatively connected to at least one of said fiberizing means and said compressing means for collecting said natural juices expressed by said fiberizing means and said compressing means to provide a reservoir of collected natural juices;
   (5) mat forming means operatively connected to said compressing means for mechanically interlocking and intertwining said compressed fiberized forage into a cohesive and shape-sustaining mat having a moisture content no greater than 75% by weight;
   (6) mat depositing means connected to said mat forming means for separating said mat into cohesive and shape-sustaining mat sections and laying said cohesive and shape-sustaining mat sections sequentially onto said stubble; and
   (7) juice application means for applying said collected natural juices onto an upper surface of each of said cohesive and shape-sustaining mat sections just after being deposited on said stubble to dry.

8. Apparatus according to claim 7 wherein said fiberizing means includes a throat means for receiving said freshly cut forage, at least one rotatable fiberizing roller having an abrasive outer surface, and an irregular surface provided adjacent said fiberizing roller, said abrasive outer surface of said fiberizing roller and said irregular surface forming a nip through which said freshly cut forage passes and is fiberized, at least one of said fiberizing roller and said irregular surface being mounted to permit variations in the size of said nip as varying amounts of freshly cut forage pass therebetween.

9. Apparatus according to claim 7 wherein said juice application means includes a perforated conduit connected to said juice collecting means, and means for transferring said collected natural juices from said collecting means to said conduit, whereby said collected natural juices are sprayed onto an upper surface of a mat section which has just been deposited on said stubble.

10. Apparatus according to claim 7 wherein said mat depositing means includes a mat cutting means comprising a pneumatic knife edge for severing said mat into successive mat sections which are then deposited on said stubble.

11. Apparatus according to claim 7, wherein said apparatus has associated therewith a motive power means for moving said apparatus about a forage field, said motive power means, cutting means and mat depositing means each traversing a respective path during movement about a forage field, said cutting means and said mat depositing means being offset from each other with respect to the direction of motion of said apparatus, there being no overlap between the path of said cutting means and the path of said motive power means.

12. Apparatus according to claim 7 wherein said fiberizing means includes a series of pairs of counter-rotatable rollers, each of said pairs comprising a first and second rotatable roller, each said first rotatable roller being rotatable faster than each respective second roller in each pair of rollers, each said second roller being mounted adjacent a respective first roller forming a nip through which said freshly cut forage passes and is fiberized, said first and second rollers in each pair of rollers being mounted to permit variations in the size of said nip as different amounts of freshly cut forage pass therebetween.

13. Apparatus according to claim 7 wherein said mat forming means includes a series of rollers of decreasing diameter in surface contact with a perforated conveyor system, whereby said fiberized plant material upon passage along said conveyor system is subjected to a gradually increasing pressure to further express natural juices therefrom and form said cohesive and self-sustaining mat.

14. Apparatus according to claim 11 wherein the width of said cutting means is greater than the width of the mat sections deposited on the stubble.

* * * * *